July 10, 1928.
R. J. REANEY
WHEEL STRUCTURE
Filed Jan. 7, 1926
1,677,104
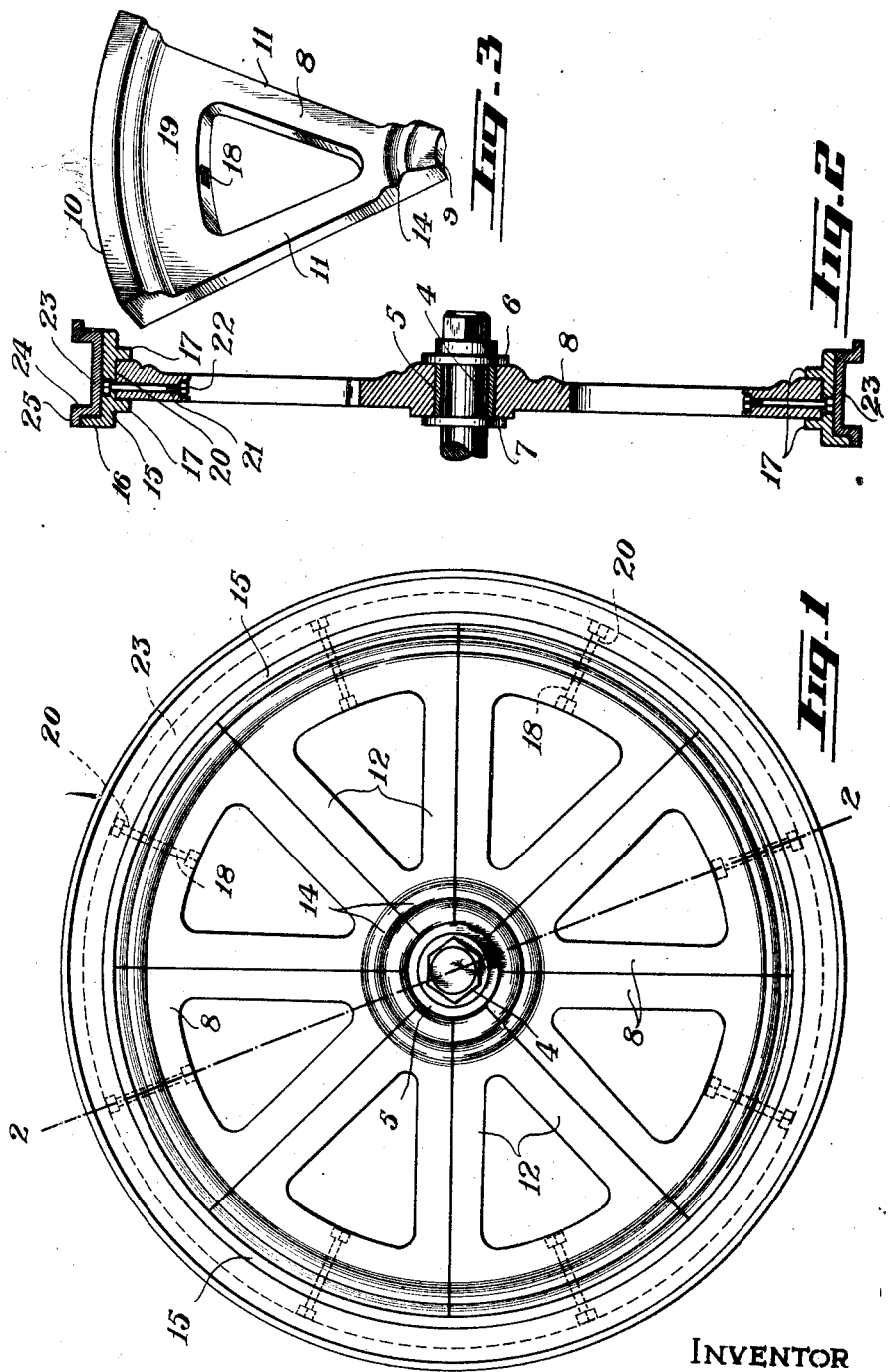
INVENTOR
Russell J. Reaney.
By
Attorney Patented July 10, 1928.

UNITED STATES PATENT OFFICE.

RUSSELL J. REANEY, OF OTTAWA, ONTARIO, CANADA, ASSIGNOR TO REANEY LIMITED, OF OTTAWA, CANADA.

WHEEL STRUCTURE.

Application filed January 7, 1926. Serial No. 79,821.

My present invention relates to improvements in a wheel structure apertaining particularly to a device of this kind that due to its formation is commonly known as a "solid" wheel.

An object is the provision of an improved wheel structure equally well adapted to be used as an automobile or other vehicle wheel, a sheave or a pulley.

A further object is to provide an improved wheel comprising a plurality of sectors united to form a wheel with novel means of applying the hub and felloe.

A further object is to provide a wheel or greater beauty, a strength and rigidity capable of effectively resisting torsional as well as other strains and a wheel that is comparatively light.

A further object is to provide a wheel of this character that may be built of waste wood cuttings and that in practice will be relatively cheap to manufacture, durable in use and especially suitable for use on automobiles and like vehicles.

To the accomplishment of these and related objects, the invention resides in the construction, combination and arrangement of parts as shall be hereinafter more fully described, illustrated in the accompanying drawings and pointed out in the claims hereunto appended.

To enable those skilled in the art to have a full and complete understanding of the invention, both from structural and functional standpoints in the accompanying drawings forming a part of this specification, I have illustrated a desirable and preferred embodiment of the invention in which:

Fig. 1 is an elevation of the wheel;

Fig. 2 is a section therethrough as on the line 2—2 of Fig. 1, and

Fig. 3 is a perspective of one of the sector members of which the wheel is composed.

In this improved wheel I purpose using wedge shaped wood blocks to receive a hub member and support a felloe or tire and to this end assemble a number of complemental sectors to form a wheel, the same having their larger ends outwardly and convexed to provide, when united, a cylindrical periphery, to which a suitable felloe or tire is applied and their inner ends concaved to form a central female opening for the reception of a spindle carrying hub. Both for structural and artistic effects, these sectors will preferably be hollowed by having their centers removed so that the skeleton when assembled will simulate spokes, the engaging radial arms of adjoining sectors uniting to form a spoke.

The felloe which has an annular groove on its inner periphery formed by a pair of spaced inwardly extending ribs is shrunk on the wheel in the usual way and further secured against any movement relative to the rest of the wheel structure by a plurality of radially disposed bolts extending through the rim portion of the sectors and the felloe.

In this completed form or in a semi-finished state, the wheel may have its outer face turned to produce a number of varied and attractive designs that at once render it more valuable and distinctive.

Throughout the detailed description of my improvement in connection with the several illustrations which have been briefly identified above, like characters of reference indicate like parts throughout the several views.

About the hub 4 which is of usual design comprising a cylindrical housing 5 for the axle spindle and a front and rear flange 6 and 7 respectively, I arrange a plurality of wedge shaped and complemental sectors 8. These are skeleton in form having their central portions removed and the interior edges of the radial sides of the sectors may be rounded. The inner ends 9 of the sectors will be concaved to conform to the curvature of the hub 4 and their outer sides 10 will be convex to provide when united a cylindrical periphery while the radial sides 11 will be true and at such relative angles that the sides of adjoining sectors, which collectively are complemental, will be contacting throughout their length. The radial arms 12 formed by each pair of adjoining sides 11 may be rounded to appear as spokes or otherwise cut to produce novel designs.

When disposed about the hub 4, the inner or tapered ends 14 of the sectors 8 are snugly and securely held between the upstanding hub flanges 6 and 7. A felloe 15 with a rear radial flange 16 is shrunk in the usual way on the outer periphery 10; a pair of spaced inwardly directed ribs 17 forming a groove between them that is adapted to receive the said periphery 10. Perforations 18 extending centrally through the broad ends 19 of the sectors 8 have registering perforations 20 in the engaging felloe 15 through which pass the radially disposed bolts 21 with nuts 22 applied to their threaded ends. Both ends of these bolt passages will preferably be countersunk.

It is obvious that the outward form of the felloe 15 may vary, the present illustration being designed to receive a demountable rim 23 whose sides 24 are laterally flanged at the top as at 25 the rear flange being adapted to extend over the upstanding back wall or flange 16.

After the wheel has been completely assembled or at any suitable stage in its construction, the same may be turned to produce the desired design or pattern on the outer face, the embodiment illustrated being reduced in thickness between the hub and felloe with decorations appearing at both the inner and outer ends of the sectors.

From the foregoing description taken in connection with the accompanying drawings, it will be manifest that a wheel structure is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new and desire to secure by Letters Patent is:—

1. A wheel structure comprising a hub, a plurality of wood blocks formed as complemental sectors arranged thereabout, said sectors being of skeleton form having the contacting sides of each pair of adjoining sectors simulating a spoke and held in place by a felloe shrunk radially thereabout.

2. A wheel structure comprising a hub, a plurality of wood blocks formed as complemental skeleton sectors arranged thereabout formed to simulate a spoke wheel, a felloe shrunk on the outer periphery of said sectors and means for securing the same thereon.

3. A wheel structure comprising a hub, a plurality of complemental skeleton sectors arranged thereabout, and a felloe shrunk on the outer periphery of said sectors, said felloe having an annular groove on its inner periphery, formed by a pair of inwardly directed ribs, adapted to receive the outer periphery of said sectors.

4. A wheel structure comprising a hub, a plurality of completmental skeleton sectors arranged thereabout, a felloe shrunk on the outer periphery of said sectors, said felloe having an annular groove on its inner periphery, formed by a pair of inwardly directed ribs, adapted to receive the outer periphery of said sectors and radially disposed elements securing said felloe to said sectors.

5. A wheel structure comprising a hub, a plurality of complemental skeleton sectors arranged thereabout, a felloe shrunk on the outer periphery of said sectors, said felloe having an annular groove on its inner periphery, formed by a pair of inwardly directed ribs, adapted to receive the outer periphery of said sectors and radially disposed bolts extending through registering perforations in said felloe and said sectors for securely fastening said felloe thereon.

6. A vehicle wheel comprising a hub, a plurality of complemental wedge shaped segments arranged thereabout, the inner ends of said segments being concaved to conform to the curvature of said hub and the outer periphery of said segments being convex to provide when assembled a circular periphery, the centers of said segments being removed, a tire shrunk on said periphery and radially disposed bolts extending through the outer edge of said segments and said felloe.

In testimony whereof I hereunto affix my signature.

RUSSELL J. REANEY.